(12) United States Patent
Zhao et al.

(10) Patent No.: US 10,168,572 B1
(45) Date of Patent: Jan. 1, 2019

(54) DISPLAY DEVICE AND BACKLIGHT SOURCE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Yanli Zhao, Beijng (CN); Xiaoji Li, Beijing (CN); Xiuzhu Tang, Beijing (CN); Keguo Liu, Beijing (CN); Changgong Zhu, Beijing (CN); Jianghong Wen, Beijing (CN); Shuangyu Li, Beijing (CN)

(73) Assignees: BOE TECHNOLOGY GROUP CO., LTD. (CN); CHONGQING BOE OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/943,757

(22) Filed: Apr. 3, 2018

(30) Foreign Application Priority Data

Sep. 28, 2017 (CN) .......................... 2017 1 0898189

(51) Int. Cl.
  *G02F 1/1335* (2006.01)
  *F21V 8/00* (2006.01)
  *G02F 1/1343* (2006.01)

(52) U.S. Cl.
  CPC ..... *G02F 1/133602* (2013.01); *G02B 6/0016* (2013.01); *G02F 1/1343* (2013.01); *G02F 1/133514* (2013.01)

(58) Field of Classification Search
  None
  See application file for complete search history.

(56) References Cited

U.S. PATENT DOCUMENTS

| 2009/0015755 | A1* | 1/2009 | Bang | G02B 6/0038 |
| | | | | 349/65 |
| 2009/0303414 | A1* | 12/2009 | Chung | G02B 5/0226 |
| | | | | 349/64 |
| 2010/0182532 | A1* | 7/2010 | Lin | G02B 5/045 |
| | | | | 349/61 |
| 2011/0109591 | A1* | 5/2011 | Kurokawa | G02F 1/13338 |
| | | | | 345/175 |
| 2011/0109592 | A1* | 5/2011 | Kurokawa | G06F 3/0412 |
| | | | | 345/175 |

(Continued)

*Primary Examiner* — Nicholas Lee
(74) *Attorney, Agent, or Firm* — Brooks Kushman P.C.

(57) ABSTRACT

The present disclosure provides a display device and a backlight source. The display device includes a liquid crystal panel and a backlight source. The liquid crystal panel includes a color filter substrate, an array substrate arranged opposite to the color filter substrate, and a blue phase liquid crystal layer arranged between the color filter substrate and the array substrate. A first driving electrode is arranged at a side of the color filter substrate facing the array substrate, and a second driving electrode is arranged at a side of the array substrate facing the color filter substrate. The backlight source includes: a light guide plate; and a composite layer arranged at a light-exiting surface of the light guide plate and including a plurality of dielectric layers whose refractive indices decrease gradually in a direction away from the light-exiting surface of the light guide plate.

19 Claims, 3 Drawing Sheets

(56) References Cited

U.S. PATENT DOCUMENTS

| | | | | |
|---|---|---|---|---|
| 2011/0249037 A1* | 10/2011 | Koyama | ............ | G02F 1/13454 345/690 |
| 2011/0267297 A1* | 11/2011 | Yamazaki | ............ | G06F 1/3265 345/173 |
| 2012/0229724 A1* | 9/2012 | Miyairi | ............ | C09K 19/0275 349/43 |
| 2013/0050597 A1* | 2/2013 | Do | ................ | H04N 13/302 349/15 |
| 2015/0177444 A1* | 6/2015 | Saito | ............... | G02F 1/133615 362/606 |

\* cited by examiner

DISPLAY DEVICE AND BACKLIGHT SOURCE

CROSS-REFERENCE TO RELATED APPLICATION

This application claims priority to Chinese Patent Application No. 201710898189.4 filed on Sep. 28, 2017, which is incorporated herein by reference in its entirety.

TECHNICAL FIELD

The present disclosure relates to the field of display technology, in particular to a display device and a backlight source.

BACKGROUND

Blue phase liquid crystals exhibit an isotropic feature in the case that no voltage is applied thereto, and exhibit an anisotropic feature under the induction of an electric field direction in the case that a voltage is applied thereto. This phenomenon is called as Kerr effect of the blue phase liquid crystals. Due to this property of the blue phase liquid crystals, a blue phase liquid crystal display has an excellent dark state, without any necessity to provide an alignment layer. In addition, the blue phase liquid crystals have such an advantage as a sub-millisecond-level response speed. Hence, it is generally agreed by the academy that the blue phase liquid crystal display will become a next-generation liquid crystal display. Usually, for the blue phase liquid crystal display, a lateral driving voltage is applied. The driving voltage is relatively high, which thus restrict the development of the blue phase liquid crystal display. A commonly-used method for reducing the driving voltage includes increasing a Kerr's constant of the blue phase liquid crystals or applying the driving voltage to a bumping electrode. However, currently the Kerr's constant of the blue phase liquid crystals has been enhanced to 13.7 $nm/V^2$, and the driving voltage is still greater than 10V. In addition, it is difficult to provide the bumping electrode, and an aperture ratio of the display may be adversely affected. In a word, there is an urgent need to reduce the driving voltage and improve the aperture ratio of a blue phase liquid crystal display.

SUMMARY

In one aspect, the present disclosure provides in some embodiments a backlight source, including: a light guide plate; a composite layer arranged at a light-exiting surface of the light guide plate and including a plurality of dielectric layers whose refractive indices decrease gradually in a direction away from the light-exiting surface of the light guide plate; a light source arranged at a light-entering side of the light guide plate; a reflector arranged at a side of the light guide plate away from the light-exiting surface; a lower prism arranged at a side of the light guide plate where the light-exiting surface is located; and an upper prism arranged at a side of the lower prism away from the light guide plate.

In a possible embodiment of the present disclosure, the lower prism includes a pad provided at a side surface away from the light guide plate with a plurality of ridge-like protrusions, and a triangular prism is arranged at each of two side surfaces of each protrusion.

In a possible embodiment of the present disclosure, a side surface of the pad adjacent to the light guide plate is parallel to the light-exiting surface of the light guide plate.

In a possible embodiment of the present disclosure, angles of the two side surfaces of at least one of the protrusions relative to the light-exiting surface of the light guide plate are identical to each other, and the two side surfaces are arranged symmetrically relative to a straight line perpendicular to the light-exiting surface of the light guide plate and passing through a vertex of the protrusion.

In a possible embodiment of the present disclosure, the angle of each of the two side surfaces of each protrusion relative to the light-exiting surface of the light guide plate is 15° to 80°.

In a possible embodiment of the present disclosure, the angle of each of the two side surfaces of each protrusion relative to the light-exiting surface of the light guide plate is 45°.

In a possible embodiment of the present disclosure, each protrusion has a height of 55 μm to 120 μm.

In a possible embodiment of the present disclosure, each protrusion has a height of 80 μm.

In a possible embodiment of the present disclosure, a distance between ridges of two adjacent protrusions is 55 μm to 100 μm.

In a possible embodiment of the present disclosure, the distance between the ridges of the two adjacent protrusions is 60 μm.

In a possible embodiment of the present disclosure, the triangular prism is made of lanthanum-doped or niobium-doped glass.

In a possible embodiment of the present disclosure, the pad is made of polyethylene terephthalate (PET).

In a possible embodiment of the present disclosure, the upper prism has a structure identical to the lower prism, and a lengthwise direction of the triangular prism of the upper prism is perpendicular to a lengthwise direction of the triangular prism of the lower prism.

In a possible embodiment of the present disclosure, the composite layer includes 3 to 6 dielectric layers.

In a possible embodiment of the present disclosure, the reflector is provided at a surface facing the array substrate with a plurality of strip-like concave structures arranged parallel to each other, and provided at a side away from the light guide plate with a silver reflection layer.

In a possible embodiment of the present disclosure, a surface of the concave structure has a curvature radius of 72 μm to 560 μm.

In a possible embodiment of the present disclosure, the composite layer is arranged between the light-exiting surface of the light guide plate and the lower prism.

In another aspect, the present disclosure provides in some embodiments a display device including a liquid crystal panel and the above-mentioned backlight source. The liquid crystal panel includes a color filter substrate, an array substrate arranged opposite to the color filter substrate, and a blue phase liquid crystal layer arranged between the color filter substrate and the array substrate. A first driving electrode is arranged at a side of the color filter substrate facing the array substrate, and a second driving electrode is arranged at a side of the array substrate facing the color filter substrate.

In a possible embodiment of the present disclosure, the first driving electrode is multiplexed as a common electrode while the second driving electrode is multiplexed as a pixel electrode, or the first driving electrode is multiplexed as a pixel electrode while the second driving electrode is multiplexed as a common electrode.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
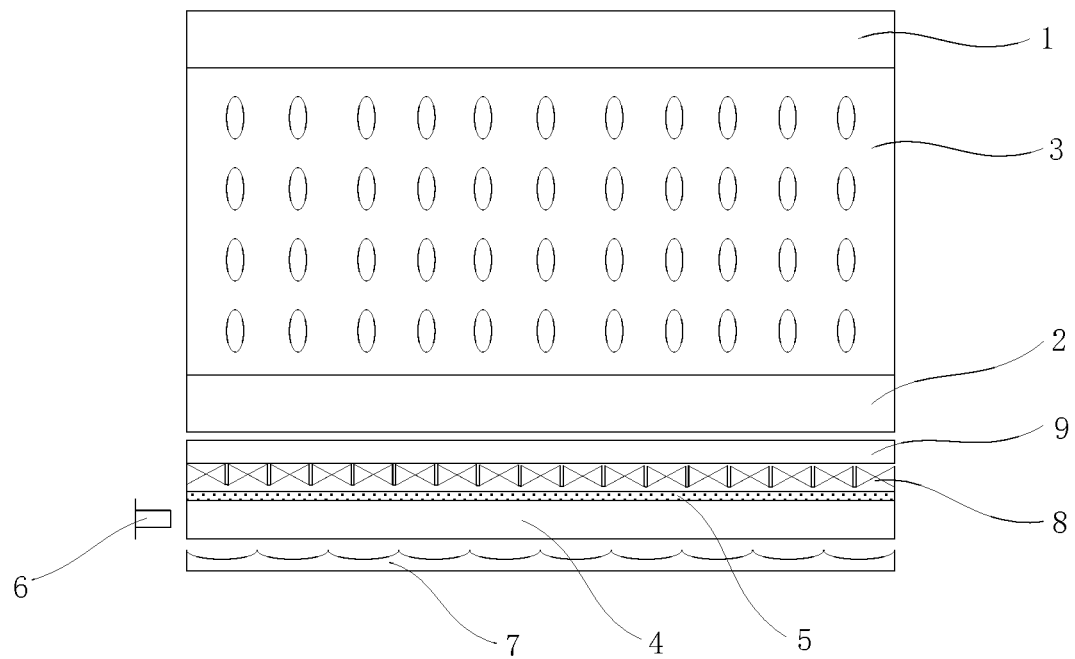
FIG. 1 is a schematic view showing a display device according to one embodiment of the present disclosure.

The present disclosure provides in some embodiments a display device which, as, shown in FIG. 1, includes a liquid crystal panel and a backlight source. The liquid crystal panel includes a color filter substrate 1, an array substrate 2 arranged opposite to the color filter substrate 1, and a blue phase liquid crystal layer 3 arranged between the color filter substrate 1 and the array substrate 2. A first driving electrode is arranged at a side of the color filter substrate 1 facing the array substrate 2, and a second driving electrode is arranged at a side of the array substrate 2 facing the color filter substrate 1. The backlight source includes: a light guide plate 4; a composite layer 5 arranged at a light-exiting surface of the light guide plate 4 and including a plurality of dielectric layers whose refractive indices decrease gradually in a direction away from the light-exiting surface of the light guide plate 4; a light source 6 arranged at a light-entering side of the light guide plate 4; a reflector 7 arranged at a side of the light guide plate 4 away from the light-exiting surface; a lower prism 8 arranged at a side of the light guide plate 4 where the light-exiting surface is located; and an upper prism 9 arranged at a side of the lower prism 8 away from the light guide plate 4.

Figure 6:
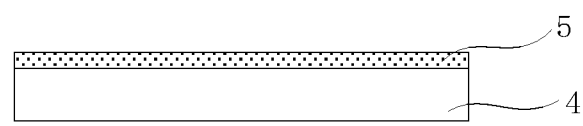
FIG. 6 is a schematic view showing a light guide plate and a composite layer according to one embodiment of the present disclosure.
Figure 7:
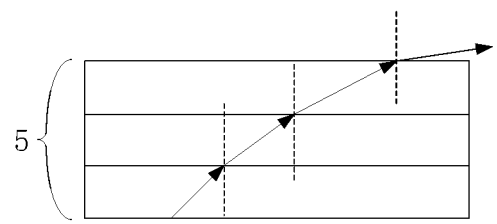
FIG. 7 is a schematic view showing an optical path of the light beam in the composite layer according to one embodiment of the present disclosure.

According to the display device in the embodiments of the present disclosure, the liquid crystal layer is the blue phase liquid crystal layer 3, the first driving electrode is arranged at the side of the color filter substrate 1 facing the array substrate 2, and the second driving electrode is arranged at the side of the array substrate 2 facing the color filter substrate 1, so it is able to generate a driving electric field perpendicular to the color filter substrate 1 and the array substrate 2, thereby to effectively reduce a driving voltage. The backlight source is arranged at the side of the array substrate 2 away from the blue phase liquid crystal layer 3. A light beam from the light source 6 arranged at the light-entering side of the light guide plate 4 enters the light guide plate 4, exits from the light-exiting surface of the light guide plate 4, and then enters the composite layer 5 at the light-exiting surface. As shown in FIGS. 6 and 7, the composite layer 5 includes the plurality of dielectric layers whose refractive indices gradually decrease in the direction away from the light-exiting surface of the light guide plate 4, i.e., the farther the dielectric layer away from the light-exiting surface, the smaller the refractive index. The light beam is refracted by the dielectric layers, so an angle of the light beam relative to a normal (i.e., a dotted line perpendicular to the layers) of the dielectric layers may become larger and larger. In the case that the light beam exists from the composite layer 5, it is able to provide the light beam with a large angle relative to the normal, i.e., provide the oblique light beam relative to a light-exiting surface of the composite layer 5. In addition, an angle of the oblique light beam relative to the light-exiting surface of the composite layer 5 is relatively small. Then, the oblique light beam passes through the lower prism 8 and the upper prism 9. Due to a convergence effect of the lower prism 8 and the upper prism 9, it is able for the oblique light beams to enter a liquid crystal panel in a better manner, thereby to improve an aperture ratio of the display device. In the case that the driving electric field is applied to the blue phase liquid crystal layer 3, blue phase liquid crystals may exhibit an anisotropic feature, so the oblique light beams may enter the display panel and pass through the blue phase liquid crystal layer 3, so as to display an image on the display panel.

Hence, in the above-mentioned display device, the driving electric field for the blue phase liquid crystal layer 3 is perpendicular to the color filter substrate 1 and the array substrate 2, so as to effectively reduce the driving voltage applied to the blue phase liquid crystals and enable the oblique light beams from the backlight source to enter the display panel in a better manner, thereby to improve the aperture ratio of the display device.

In a possible embodiment of the present disclosure, the first driving electrode may be multiplexed as a common electrode while the second driving electrode may be multiplexed as a pixel electrode, or the first driving electrode may be multiplexed as a pixel electrode while the second driving electrode may be multiplexed as a common electrode.

Figure 2:
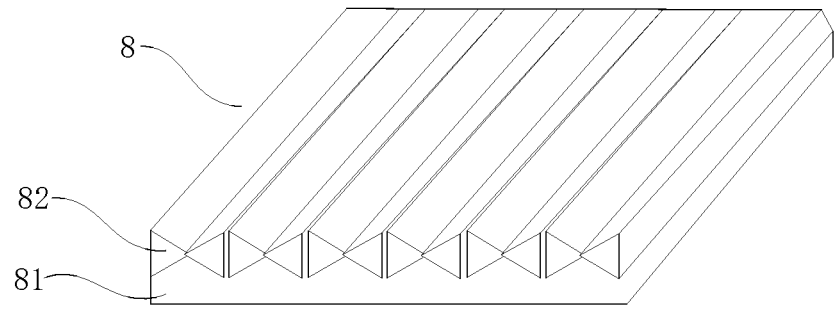
FIG. 2 is a schematic view showing a lower prism according to one embodiment of the present disclosure.
Figure 3:
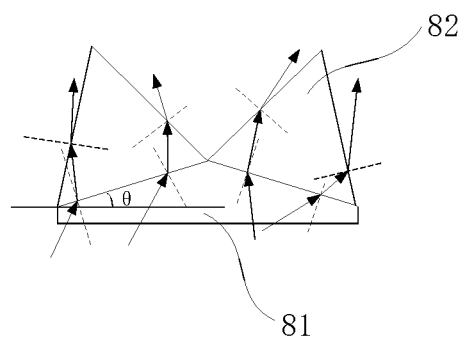
FIG. 3 is a schematic view showing an optical path of a light beam in the lower prism according to one embodiment of the present disclosure.

As shown in FIGS. 2 and 3, the lower prism 8 includes a pad 81. A side surface of the pad 81 adjacent to the light guide plate 4 is parallel to the light-exiting surface of the light guide plate 4, the pad 81 is provided at a side surface away from the light guide plate 4 with a plurality of ridge-like protrusions, and a triangular prism 82 is arranged at each of the two side surfaces of each protrusion. The light beam passing through the composite layer 5 on the light guide plate 4 may enter the pad 81, and then enter a first surface of the triangular prism 82 in contact with the side surface of the protrusion of the pad 81. As shown in FIG. 3, depending on a refraction principle of the triangular prism 82, the light beam entering the triangular prism 82 via the first surface may exit from a second surface or a third surface of the triangular prism 82 in such a manner as to be biased toward a ridge facing the first surface. In other words, the triangular prism 82 may converge the light beams entering the triangular prism 82 via the first surface.

In the pad 81, angles of the two side surfaces of at least one of the protrusions relative to the light-exiting surface of the light guide plate 4 are identical to each other, and the two side surfaces are arranged symmetrically relative to a straight line perpendicular to the light-exiting surface of the light guide plate 4 and passing through a vertex of the protrusion. With respect to this protrusion, in the case that the two triangular prisms 82 are arranged on the side surfaces of the protrusion respectively, an inclined angle of the two first surfaces are identical to each other, and the two first surfaces are arranged symmetrically relative to the straight line perpendicular to the light-exiting surface of the light guide plate 4 and passing through the vertex of the protrusion. In this regard, the two triangular prisms 82 may converge the light beams in different directions, so it is able for the lower prism 8 to converge the light beams in different directions.

In a possible embodiment of the present disclosure, as shown in FIG. 3, because the side of the pad 81 facing the light-exiting surface of the light guide plate 4 is parallel to the light-exiting surface of the light guide plate 4, depending on a triangular principle, an acute angle θ in FIG. 3 is just the angle of each of the two side surfaces of the protrusion relative to the light-exiting surface of the light guide plate 4, and the acute angle is 15° to 80°. In the case that the acute angle is 15° to 80°, it is able to provide the lower prism 8 with a better convergence effect.

In a possible embodiment of the present disclosure, the angle of each of the two side surfaces of each protrusion relative to the light-exiting surface of the light guide plate is 45°. In this way, it is able to provide the lower prism 8 with a better convergence effect.

In a possible embodiment of the present disclosure, each protrusion has a height of 55 μm to 120 μm. Here, the height of the protrusion refers to a distance between a ridge of the protrusion and the surface of the pad 81 parallel to the light-exiting surface of the light guide plate 4.

In a possible embodiment of the present disclosure, each protrusion has a height of 80 μm.

In a possible embodiment of the present disclosure, a distance between ridges of two adjacent protrusions is 55 μm to 100 μm. In this way, it is able to limit the amount of the light beams entering each triangular prism 82 of the lower prism 8, thereby to ensure the evenness of the light beams from the lower prism 8.

In a possible embodiment of the present disclosure, the distance between the ridges of the two adjacent protrusions is 60 μm. In this way, it is able to limit the amount of the light beams entering each triangular prism 82 of the lower prism 8 in an appropriate manner, thereby to ensure the evenness of the light beams from the lower prism 8 in a better manner.

In a possible embodiment of the present disclosure, the triangular prism is made of lanthanum-doped or niobium-doped glass. Of course, any other material having a high refractive index may also be used, so as to improve the convergence effect of the lower prism 8.

In a possible embodiment of the present disclosure, the pad 81 is made of PET.

In a possible embodiment of the present disclosure, the upper prism 9 has a structure identical to the lower prism 8, and a lengthwise direction of the triangular prism 82 of the upper prism 9 is perpendicular to a lengthwise direction of the triangular prism 82 of the lower prism 8. In this regard, it is able for the upper prism 9 to converge the light beams in a direction different from the lower prism 8. Through the upper prism 9 on the lower prism 8 and the cooperation therebetween, it is able to improve the evenness of the light beams from the backlight source.

In a possible embodiment of the present disclosure, the composite layer includes 3 to 6 dielectric layers.

Figure 4:
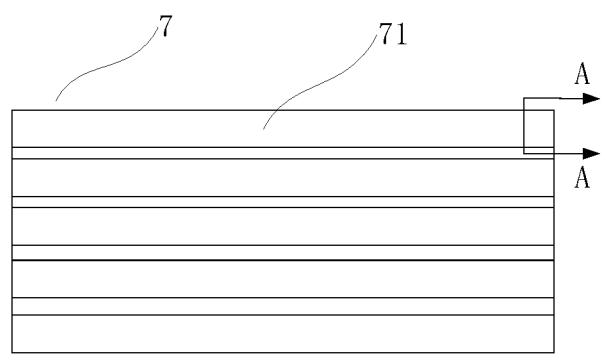
FIG. 4 is a top view of a reflector according to one embodiment of the present disclosure.
Figure 5:
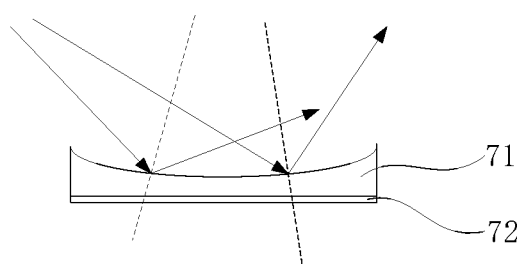
FIG. 5 is a sectional view of the reflector along line A-A in FIG. 4.

As shown in FIGS. 4 and 5, the reflector 7 is provided at a surface facing the array substrate 2 with a plurality of strip-like concave structures 71 arranged parallel to each other, and provided at a side away from the light guide plate 4 with a silver reflection layer 72. Each concave structure 71 is of a curved surface, so as to prevent the occurrence of diffraction or interference in the case that the light beam is reflected by the curved surface of the concave structure 71. Through the silver reflection layer 72, it is able to reflect the light beams in a total-reflection manner, thereby to improve the utilization of the light beams.

In a possible embodiment of the present disclosure, the curved surface of the concave structure 71 has a curvature radius of 72 μm to 560 μm. In this way, it is able to further prevent the occurrence of diffraction or interference in the case that the light beam is reflected by the curved surface of the concave structure 71.

The present disclosure further provides in some embodiments a backlight source for a blue phase liquid crystal display device, which includes: a light guide plate 4, a composite layer 5 arranged at a light-exiting surface of the light guide plate 4 and including a plurality of dielectric layers whose refractive indices decrease in a direction away from the light-exiting surface of the light guide plate 4; a light source 6 arranged at a light-entering side of the light guide plate 4; a reflector 7 arranged at a side of the light guide plate 4 away from the light-exiting surface; a lower prism 8 arranged at a side of the light guide plate 4 where the light-exiting surface is located; and an upper prism 9 located at a side of the lower prism 8 away from the light guide plate 4.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A backlight source for use in a blue phase liquid crystal display device, comprising:
    a light guide plate;
    a composite layer arranged at a light-exiting surface of the light guide plate and including a plurality of dielectric layers whose refractive indices decrease gradually in a direction away from the light-exiting surface of the light guide plate;
    a light source arranged at a light-entering side of the light guide plate;
    a reflector arranged at a side of the light guide plate away from the light-exiting surface;
    a lower prism arranged at a side of the light guide plate where the light-exiting surface is located; and an upper prism located at a side of the lower prism away from the light guide plate.

2. The backlight source according to claim 1, wherein the lower prism comprises a pad provided at a side surface away from the light guide plate with a plurality of ridge-like protrusions, and a triangular prism is arranged at each of two side surfaces of each protrusion.

3. The backlight source according to claim 2, wherein a side surface of the pad adjacent to the light guide plate is parallel to the light-exiting surface of the light guide plate.

4. The backlight source according to claim 3, wherein angles of the two side surfaces of at least one of the protrusions relative to the light-exiting surface of the light guide plate are identical to each other, and the two side surfaces are arranged symmetrically relative to a straight line perpendicular to the light-exiting surface of the light guide plate and passing through a vertex of the protrusion.

5. The backlight source according to claim 4, wherein the angle of each of the two side surfaces of each protrusion relative to the light-exiting surface of the light guide plate is 15° to 80°.

6. The backlight source according to claim 5, wherein the angle of each of the two side surfaces of each protrusion relative to the light-exiting surface of the light guide plate is 45°.

7. The backlight source according to claim 3, wherein each protrusion has a height of 55 μm to 120 μm.

8. The backlight source according to claim 7, wherein each protrusion has a height of 80 μm.

9. The backlight source according to claim 3, wherein a distance between ridges of two adjacent protrusions is 55 μm to 100 μm.

10. The backlight source according to claim 9, wherein the distance between the ridges of the two adjacent protrusions is 60 μm.

11. The backlight source according to claim 3, wherein the triangular prism is made of lanthanum-doped or niobium-doped glass.

12. The backlight source according to claim 3, wherein the pad is made of polyethylene terephthalate (PET).

13. The backlight source according to claim 3, wherein the upper prism has a structure identical to the lower prism, and a lengthwise direction of the triangular prism of the upper prism is perpendicular to a lengthwise direction of the triangular prism of the lower prism.

14. The backlight source according to claim 1, wherein the composite layer comprises 3 to 6 dielectric layers.

15. The backlight source according to claim 1, wherein the reflector is provided at a surface facing the light guide plate with a plurality of strip-like concave structures arranged parallel to each other, and provided at a side away from the light guide plate with a silver reflection layer.

16. The backlight source according to claim 15, wherein a surface of the concave structure has a curvature radius of 72 μm to 560 μm.

17. The backlight source according to claim 1, wherein the composite layer is arranged between the light-exiting surface of the light guide plate and the lower prism.

18. A display device, comprising a liquid crystal panel and the backlight source according to claim 1, wherein the liquid crystal panel comprises a color filter substrate, an array substrate arranged opposite to the color filter substrate, and a blue phase liquid crystal layer arranged between the color filter substrate and the array substrate, wherein a first driving electrode is arranged at a side of the color filter substrate facing the array substrate, and a second driving electrode is arranged at a side of the array substrate facing the color filter substrate.

19. The display device according to claim 18, wherein the first driving electrode is multiplexed as a common electrode while the second driving electrode is multiplexed as a pixel electrode, or the first driving electrode is multiplexed as a pixel electrode while the second driving electrode is multiplexed as a common electrode.

\* \* \* \* \*